1

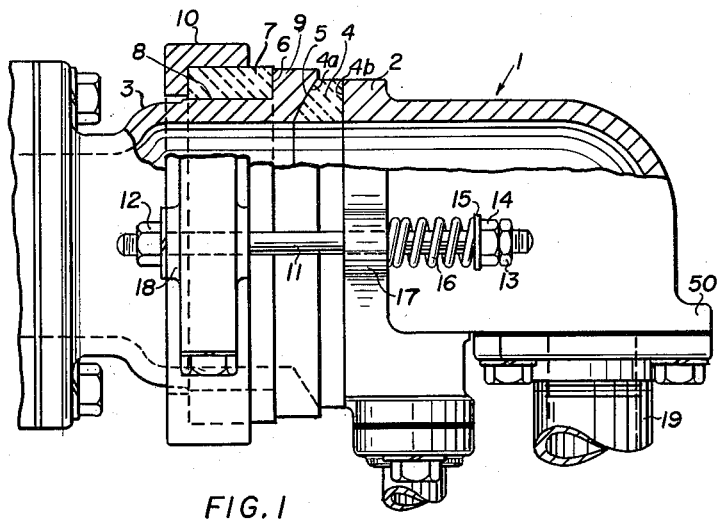
July 23, 1963     W. G. S. SMITH     3,098,665
PRESSURE COMPENSATOR FOR ROTARY FLUID JOINTS
Filed March 17, 1960
INVENTOR
WILLIAM G. S. SMITH
BY— Fetherstonhaugh + Co.
ATTORNEYS United States Patent Office 3,098,665
Patented July 23, 1963

3,098,665
PRESSURE COMPENSATOR FOR ROTARY
FLUID JOINTS
William George S. Smith, 18 Marcelle Ave.,
Corner Brook, Newfoundland, Canada
Filed Mar. 17, 1960, Ser. No. 15,753
15 Claims. (Cl. 285—134)

This invention relates to improvements in rotary fluid joints such as are used to provide connection between rotating pressure vessels and their supply and return piping, for example those commonly in use on open geared paper machine dryer cylinders.

Rotary joint structures must be so constructed as to obviate leakage of steam or other gas from points of contact between stationary and rotary sections of rotary equipment. In conventional drying equipment the assembly usually comprises a graphite or carbon sealer ring mounted between the faces of stationary and rotary sections of the joint. The faces of the rotary and stationary sections and of the sealer ring are commonly maintained in gas-tight contact by means of a heavy spring or springs normally urging the faces together through a carbon or graphite thrust ring. The conventional structure is described below and may be seen in FIGURE 1 of the drawings.

(a) It has been proposed to eliminate the heavy springs and thrust rings by using a spring and diaphragm arrangement in which the spring is sufficient only to maintain the sections of a joint in their proper positions when the joint is not in operation. In such an arrangement the diaphragm is adapted to be subjected to the same pressure as exists at any time within the joint during operation and is arranged to transmit thereto a thrust at least equal and opposite to the pressure force tending to open the joint. However, failure of the diaphragm during operation of the joint necessitates shut-down of the apparatus with which the joint is associated for repair or replacement of the diaphragm; the same inconvenience as found with the other known devices.

(b) The principal object of the invention is to provide an improved pressure compensating apparatus for use with a rotary fluid joint.

(c) Another object of the invention is to provide for use with a rotary fluid joint a pressure compensating apparatus having a mechanism removable and replaceable during operation of the joint.

An ancillary object of the invention is the conversion of conventional spring loaded rotary joints into a diaphragm loaded type while retaining their existing castings and carbon face washers.

The invention in its broadest aspect provides a pressure compensating apparatus for use with a rotary fluid joint, comprising a thrust-transmitting assembly adapted to bear on the joint, and pressure responsive means together with a thrust-generating means both adapted to act on the thrust-transmitting assembly, the pressure responsive means acting at the end on the assembly remote from the joint and the thrust-generating means acting on the assembly at a point intermediate the pressure responsive means and the joint. The pressure responsive means comprises a fixed member and a movable member defining a chamber, the movable member being associated with the remote end of the thrust-transmitting assembly. Support means are provided to support the thrust-generating means independently of said fixed member so that the pressure responsive means may be dissociated from the apparatus while the thrust-generating means maintains a thrust against the joint. The chamber is adapted for open communication with the joint whereby said thrust-transmitting assembly brings to bear upon said joint a degree of thrust,

2 acting in one direction, at least equal to the opposing force tending to open the joint.

In a preferred embodiment of the invention, the pressure responsive means comprises a flexible diaphragm positioned in a rigid-walled housing to form the chamber, the diaphragm acting against the thrust-transmitting assembly and the housing being immovably supported by one of the support means.

The description will be based on embodiments of the invention illustrated in the accompanying drawings in which:

FIGURE 1 is a diagrammatic representation of a conventional rotary fluid joint;

FIGURE 2 is a side view partly in section of the pressure compensator according to the invention; and FIGURE 3 is a modification of the bearing structure for the pressure compensator shown in FIGURE 2.

In FIGURE 1, illustrating the conventional spring loaded rotary fluid joint, the numeral 1 indicates generally a rotary fluid joint, 2 being the stationary section and 3 the rotary section. A graphite sealing ring 4 having one spherical face 4a and one flat face 4b is mounted between the faces of the stationary section 2 and rotary section 3, and is held in place by a spherical face 5 of the rotary section 3. A graphite thrust ring 7 bears against the wall of rotary section 3 at 8 and against a square shoulder 6 formed by a flange 9, the rotary section 3 and thrust ring 7 being held in position by means of an annular flanged thrust ring 10 which is tied to stationary section 2 by means of threaded rods or bolts 11 passing through bearing members 17 on stationary section 2 and bearing members 18 on thrust ring 10. Nuts 12, 13 and 14 hold rod 11 in bearing members 17 and 18 while compression springs 16 mounted on rods 11 bear against members 17 and 18 and through washers 15 against nuts 14 and 13.

Compression springs 16 are so compressed as to withstand maximum steam pressure within rotary joint 1. The pressure tends to force the joint open at the areas of contact between graphite sealer ring 4 with stationary section 2 and rotary section 3, thereby contributing to loss of steam and decreased pressure.

Springs 16 acting through the rod and nut assembly force stationary section 2 and rotary section 3 into gas-tight contact with ring 4 and when gas pressure within the joint is at or near the maximum then pressure of contact between the stationary and rotary sections is relatively low and the joint operates very satisfactorily. However, when pressure is relatively low within the joint then pressure of contact between the sections is exceedingly high and wear on both faces of the sealing ring 4, on face 5 of the rotary section and the flat face of the stationary section is excessive. In addition there is danger of sparking at face 6 of the thrust ring 7 and the consequent fire hazard. In other words conventional rotary fluid joint-closing assemblies are not satisfactory and the structures according to the invention as shown in FIGURES 2 and 3 are designed to obviate existing disadvantages.

FIGURE 2, illustrating a compensator of the present invention replacing spring 16 and its accessories, shows a portion of the stationary section 2 of the rotary fluid joint, and a portion of the steam or gas inlet pipe indicated at 19. A pressure responsive means, having a fixed member in the form of a housing indicated generally at 20, includes paired members 21 and 22 which preferably are circular in outline and convex in shape, their peripheries being flattened somewhat. Member 21 is the rear member and is provided with a bracket 23 which is secured to a supporting device or stand 24 in a suitable manner not shown. The illustrated supporting structure 24 is actually a catwalk.

Holes are provided at spaced intervals in the flattened peripheral edges of the paired members 21 and 22 in order that the said members may be bolted together by means of bolts 26 and nuts 27. Member 21 has a centrally located aperture 28 and member 22 a centrally located bossed aperture 29 into which is threaded a conduit 30.

Sandwiched between the flattened peripheries of the two convex members 21 and 22 is the periphery of a flexible pressure-responsive member such as a diaphragm 31 which is secured to the two members 21 and 22 by the bolts 26 and which constitutes the movable member of the pressure responsive means. The space or chamber defined between the diaphragm and member 21 has been identified as 32 and that between the diaphragm and member 22 as 33, chamber 33 being gas-tight.

A thrust-transmitting assembly comprising a sectional push-rod 34, divided at 34a, extends through aperture 28 in member 21. The rod moves backwards and forwards in said aperture which may form a bearing for the rod 34. A rigid force-transmitting member such as a plate 35 is mounted on the push-rod and situated within the space 32 and is free for reciprocating motion therein with rod 34. Plate 35 is in contact with diaphragm 31 and is preferably circular in outline. The opposite end 36 of the push-rod assembly is designed to be inserted into a socket or recessed boss 37 mounted on steam inlet pipe 19. A tubular casing 38 extends over a portion of the length of push-rod 34. In FIGURE 2 the casing is shown mounted on stand 24 though any convenient mounting may be employed. The end of the casing member 38 remote from compensator housing 20 carries a flange 39. The division of push-rod 34 into two sections at 34a must occur within casing 38.

Push-rod 34 is threaded over a portion of its length, the threaded portion having mounted thereon in order, a threaded sleeve 40, a lock nut 42, lock nuts 43, 44, a metal plate or washer 45 and a thrust-generating member in the form of a compression spring 46 extending between plate 45 and flange 39, the sleeve 40 and the nuts 42, 43 and 44 being individually adjustable along rod 34. Sleeve 40 carries an abutment shoulder 41 at its free end designed to be inserted into the socket of boss 37.

The structure shown in FIGURE 2 is designed to transmit thrust through the push-rod assembly directly to the rotary joint 1 but where it becomes necessary or desirable to transmit the thrust indirectly the slight modification shown in FIGURE 3 may be resorted to.

FIGURE 3 is a modification of the socket structure 37, shown in FIGURE 2 where it is not convenient to apply the force of the pressure compensator directly against steam inlet pipe 19. In this modification a T-shaped bracket 47 having an upright portion 48 and a supporting cross member 49 is rigidly mounted by bolts 50 in the cross member to a flange 51 which is formed integral with stationary section 2 of fluid joint 1. Upright portion 48 of bracket 47 comprises a curved portion 52 designed to fit the contour of stationary section 2. Upright portion 48 carries a socketed boss 37a into which shoulder 41 of sleeve 40 may be inserted whereby thrust may be exerted indirectly from the push-rod 34 through bracket 47 to the rotary joint.

The pressure compensator operates as follows:

Initially, compression spring 46 is so compressed by lock nuts 43, 44 as to bring the faces of the steam-joint into initial contact. Before spring 46 is compressed sleeve 40 allows for a fine adjustment to bring shoulder 41 into abutment with boss 37 and the diaphragm into operating position. Spring 46 in acting against plate 45 and lock nuts 44 and 43 forces push-rod 34 to the left in FIGURES 2 and 3 thereby providing the thrust necessary to achieve initial contact between the faces of sealing ring 4 with stationary section 2 and rotary section 3. Steam under high pressure is then admitted to the joint 1 through steam line 19, a portion of the steam being by-passed through a separate line, not shown, to gas-tight pressure chamber 33 defined between diaphragm 31 and member 22, the by-passed steam being admitted to chamber 33 through aperture 29 and conduit 30. The steam tends to force the joint faces apart but as steam pressure builds up in the joint a corresponding steam pressure is built up in chamber 33 and that pressure forces diaphragm 31 to the left in FIGURE 2 and with it plate 35 and the entire push-rod assembly. The end 36 of the push-rod consequently exerts the required thrust against steam-pipe 19 and the joint assembly 1 thereby forcing the joint faces to remain in gas-tight relationship. The effective area of the diaphragm 31 is so proportioned in relation to the area of the face of the rotary joint and the location of the push-rod socket 37 or 37a that when acted upon by pressure of the same magnitude as that inside the rotary joint, it will exert through the push rod a closing force just sufficient to maintain the faces in gas tight contact.

If it is for any reason inconvenient to use the set-up shown in FIGURE 2 that shown in FIGURE 3 may be resorted to in which case the thrust against the joint assembly will be exerted indirectly through bracket 47.

If it becomes necessary to repair the pressure compensator repairs may be carried out without stopping the rotary joint and without discontinuing production. By moving plate 45, with lock nuts 43 and 44, to the right spring 46 may be compressed to any desired degree and where necessary may be so tightly compressed that it will cause the push-rod assembly to exert a very high degree of thrust against the joint assembly, sufficient in fact to maintain the joint faces in gas-tight contact for any given length of time independently of any assistance from steam pressure against diaphragm 31, whereupon required repairs may be made and normal operation of the compensator and joint assemblies resumed. If necessary, the pressure compensator and that portion of the push-rod assembly to the right of division 34a may be completely withdrawn for repair or replacement.

What I claim is:

1. Pressure compensation apparatus for use with a rotary fluid joint, comprising a thrust-transmitting assembly adapted to bear on the joint, a pressure responsive means adapted to act on the end of said assembly remote from the joint, a thrust-generating means adapted to act on said assembly intermediate the pressure responsive means and the joint, the pressure responsive means having a fixed member and a movable member, the movable member being associated with said remote end of said assembly, means adapted to support the thrust-generating means independently of said fixed member whereby the pressure responsive means may be dissociated from the apparatus while the thrust-generating means maintains a thrust against the joint, and a chamber defined by said fixed and movable members, said chamber being adapted for open communication with the joint whereby said thrust-transmitting assembly brings to bear upon said joint a degree of thrust, acting in one direction, at least equal to the opposing force tending to open the joint.

2. Pressure compensating apparatus as defined in claim 1 wherein the pressure responsive means comprises a rigid-walled housing and a flexible diaphragm, the latter being positioned in said housing to form therewith said chamber.

3. Pressure compensating apparatus as defined in claim 2 wherein the rigid-walled housing comprises the fixed member, and the flexible diaphragm comprises the movable member associated with said remote end of the thrust-transmitting assembly.

4. Pressure compensating apparatus as defined in claim 1 wherein the thrust-generating means comprises a compression spring.

5. Pressure compensating apparatus as defined in claim 1 wherein the thrust-transmitting assembly comprises a rigid thrust rod having mounted thereon the thrust-generating means.

6. Pressure compensating apparatus as defined in claim 5 wherein the thrust-generating means comprises a compression spring mounted on the thrust rod.

7. Pressure compensating apparatus as defined in claim 6 including two restraining means for the compression spring, one of said restraining means being fixed independent of the thrust rod and the other of said restraining means being adjustable on the thrust rod.

8. In combination a rotary fluid joint assembly including a conduit adapted to carry pressure medium from said joint assembly, a reciprocable thrust-transmitting assembly in endwise contact with said joint assembly, a thrust-generating member mounted on said thrust-transmitting assembly, said thrust-transmitting assembly including a pressure-plate mounted endwise of said thrust assembly remote from and independent of said thrust-generating member and said joint assembly, a fixed rigid-walled housing for said pressure plate, a pressure-actuable flexible member in said housing in contact with said plate, a pressure chamber within said housing and defined by a section of said housings and said flexible member, said pressure chamber being in open communication with said conduit whereby any increase in pressure in said joint assembly is immediately transmitted to said pressure chamber, said flexible member acting under said increased pressure to transmit thrust to said thrust assembly and to said joint assembly to bring to bear on the joint of said assembly a degree of thrust, acting in one direction, at least equal to the opposing force tending to open the joint.

9. The combination as defined in claim 8 wherein the thrust-transmitting assembly bears upon the joint assembly through a socket associated with the joint assembly.

10. The combination as defined in claim 8 wherein a bracket is interposed between the thrust-transmitting assembly and the joint assembly, the thrust being transmitted through the bracket to the joint assembly.

11. A pressure compensating apparatus comprising a rigid movable thrust rod and mounted thereon a compression spring, restraining means for said spring, one of said restraining means being fixed independent of the thrust rod and the other of said restraining means being adjustable for determining the degree of restraint acting on said spring, a pressure plate mounted endwise of said rod remote from said adjustable restraining means, a housing for said pressure plate fixedly mounted independently of said rod and of said one restraining means, said plate and said rod being freely mounted for reciprocating movement within and with respect to said housing, said rod extending through an aperture in the housing, a pressure-responsive flexible member positioned to divide said housing into two chambers one of said chambers being gas-tight, said flexible member being in contact with said pressure plate and separating said plate from said gas-tight chamber, means for admitting pressure medium to said gas-tight chamber whereby pressure may be exerted against said flexible member and imparted to said pressure plate and said thrust rod.

12. A pressure compensating apparatus as defined in claim 11 including means at the end of the thrust rod remote from the pressure plate adapted to adjust the length of the thrust rod.

13. A pressure compensating apparatus as defined in claim 11 wherein the thrust rod is movable in a fixed sleeve intermediate the compression spring and the pressure plate, said fixed restraining means being associated with said sleeve.

14. A pressure compensating apparatus as defined in claim 13 wherein the thrust rod is separable in its portion moving within said sleeve.

15. A pressure compensating apparatus as defined in claim 11 wherein the housing comprises a pair of rigid convex walls, the flexible member being sandwiched between said walls.

References Cited in the file of this patent

UNITED STATES PATENTS

| 1,360,421 | Lloyd | Nov. 30, 1920 |
| 1,769,905 | Berry | July 1, 1930 |
| 2,130,799 | Hofstetter | Sept. 20, 1938 |
| 2,204,139 | Knowlton | June 11, 1940 |
| 2,478,002 | Mott | Aug. 2, 1948 |
| 2,649,843 | Province | Aug. 25, 1953 |
| 2,787,124 | Donahue | Apr. 2, 1957 |

FOREIGN PATENTS

| 953,675 | Germany | Nov. 25, 1956 |